(12) United States Patent
Shi et al.

(10) Patent No.: US 12,505,354 B2
(45) Date of Patent: Dec. 23, 2025

(54) METHOD FOR PREDICTING AND OPTIMIZING PENETRATION RATE IN OIL AND GAS DRILLING BASED ON CART ALGORITHM

(71) Applicant: Southwest Petroleum University, Chengdu (CN)

(72) Inventors: Xiangchao Shi, Chengdu (CN); Ergang Zhang, Chengdu (CN); Quan Cao, Chengdu (CN); Shan Jiang, Chengdu (CN); Yuehao Liu, Chengdu (CN); Yuming Wang, Chengdu (CN)

( * ) Notice: Subject to any disclaimer, the term of this patent is extended or adjusted under 35 U.S.C. 154(b) by 1011 days.

(21) Appl. No.: 17/548,033

(22) Filed: Dec. 10, 2021

(65) Prior Publication Data

US 2022/0188648 A1 Jun. 16, 2022

(30) Foreign Application Priority Data

Dec. 10, 2020 (CN) .......................... 202011454345.6

(51) Int. Cl.
*G06N 5/01* (2023.01)
*G06N 5/04* (2023.01)

(52) U.S. Cl.
CPC ................. *G06N 5/01* (2023.01); *G06N 5/04* (2013.01)

(58) Field of Classification Search
CPC .................................... G06N 5/01; G06N 5/04
See application file for complete search history.

(56) References Cited

U.S. PATENT DOCUMENTS

2012/0123756 A1* 5/2012 Wang ...................... E21B 44/00
703/2
2019/0345808 A1* 11/2019 Suryadi ................... E21B 43/12

OTHER PUBLICATIONS

Mohammad Sabah, NPL, "A machine learning approach to predict drilling rate using petrophysical and mud logging data", Mar. 25, 2019 (Year: 2019).*
Quanshen Liu, NPL, "Prediction model of rock mass class using classification and regression tree integrated AdaBoost algorithm based on TBM driving data", Aug. 26, 2020 (Year: 2020).*
Djamil Rezki, NPL, "Rate of Penetration (ROP) Prediction in Oil Drilling Based on Ensemble Machine Learning", Lecture Notes in information systems and organisation 35, pp. 537-549, Sep. 2020 (Year: 2020).*
Xia Jiaxiang, NPL, "Key technologies for well drilling and completion in ultra-deep sour gas reservoirs, Yuanba Gasfield, Sichuan Basin", Published Jul. 8, 2017 (Year: 2017).*
Bi Xue-liang et al "Research on optimizing bit by neural network in Qingshen Oilfield" Journal of Harbin Engineering University; vol. 27 Suppl; Jul. 2006; pp. 111-114.
Shan Jingfu, et al.; "Identification of complex lithology for tight sandstone gas reservoirs sase on BP neural net Using BP Neural Net"; Progress in Geophysics, 2015, pp. 1257-126, 30(3).

(Continued)

*Primary Examiner* — Rehana Perveen
*Assistant Examiner* — Angel Calle
(74) *Attorney, Agent, or Firm* — Addison D. Ault; IPGentleman Intellectual Property Services, LLC

(57) ABSTRACT

The present invention relates to a method for predicting and optimizing a penetration rate in oil and gas drilling based on a CART algorithm. The method provided by the present invention can shorten the drilling cycle and reduce the drilling cost, thereby greatly improving the development efficiency of oil and gas resources.

4 Claims, 6 Drawing Sheets

(56) References Cited

OTHER PUBLICATIONS

A. T. Bourgoyne, Jr. et al; "A Multiple Regression Approach to Optimal Drilling and Abnormal Pressure Detection"; Society of Petroleum Engineers Journal; 1974; pp. 371-384.
Young F S. et al. "Computerized Drilling Control"; Journal of Petroleum Technology, 1969,21(04); pp. 483-496.
Warren T M.; "Penetration-rate performance of roller-cone bits"; SPE Drilling Engineering, 1987, 2(01); pp. 9-18.

* cited by examiner

METHOD FOR PREDICTING AND OPTIMIZING PENETRATION RATE IN OIL AND GAS DRILLING BASED ON CART ALGORITHM

TECHNICAL FIELD

The present invention relates to a method for predicting and optimizing a penetration rate in the field of petroleum exploration and development, in particular to a method for predicting and optimizing a penetration rate based on a CART algorithm.

BACKGROUND ART

In recent years, with the increase in the exploration scale of oil and gas resources and the strengthening of development efforts, oil and gas exploration targets of various oil fields have gradually shifted from shallow formations to deep formations, while deep wells, ultra-deep wells, horizontal wells and extended reach wells are of the optimal way to achieve high-efficiency development of oil and gas resources in deep formations. In the process of drilling and mining in deep and ultra-deep wells, due to complex geological conditions and harsh downhole conditions, engineering construction operations are facing great challenges. In order to better develop deep oil and gas resources, it is the general trend to shorten the drilling cycle, reduce the drilling cost and improve the drilling efficiency, and the most direct and effective way to solve these problems is to increase a penetration rate. Therefore, the ability to better predict the penetration rate is of great significance for optimizing the drilling technologies, shortening the drilling cycle, and reducing the drilling cost.

Since the 1950s, some scholars (Young F S. Computerized Drilling Control[J]. Journal of Petroleum Technology, 1969,21(04):483-496) have taken the main factors of drilling technologies such as weight-on-bit, rotational speed, and displacement into consideration, used a regression analysis method to obtain a drilling rate equation (Bourgoyne A T, Young F S. A Multiple Regression Approach to Optimal Drilling and Abnormal Pressure Detection[J]. Society of Petroleum Engineers Journal, 1974, 14(04):371-384), proposed methods for determining various coefficients in the drilling rate equation by using a multiple regression method in conjunction with field drilling data, and thus established a drilling rate equation for actual field requirements to guide the prediction and optimization of the penetration rate. Later, some scholars (Warren T M. Penetration-rate performance of roller-cone bits[J]. SPE Drilling Engineering, 1987, 2(01): 9-18) comprehensively considered the impacts of multiple influencing factors such as a weight on bit, rotational speed, bit size, bit model, rock strength and drilling fluid properties on the penetration rate, and established a penetration rate equation suitable for soft formations. In recent years, with the rapid development of big data technology and the rapid growth of drilling data, there have been many cases of using a machine learning method to mine data and apply it to the drilling industry, which have been effectively applied in fields such as bit selection (Bi Xueliang, Yan Tie, Tao Lijie. Research on Optimization of Drill Bits by Neural Network Method in Qingshen Oilfield[J]. Journal of Harbin Engineering University, 2006, 27(z1):111-114), Lithology Identification (Shan Jingfu, Chen Xinxin, Zhao Zhongjun, et al. Using BP Neural Network Method to Identify Complex Lithology of Tight Sandstone Gas Reservoirs[J]. Progress in Geophysics, 2015(3):1257-1263). However, there are few studies and reports on prediction and optimization of a penetration rate by using a machine learning method.

SUMMARY OF THE INVENTION

An objective of the present invention is to provide a method for predicting and optimizing a penetration rate in oil and gas drilling based on a CART algorithm. The method is reliable in principle and easy to operate, can improve the drilling efficiency, shorten the drilling cycle and reduce the drilling cost, thereby greatly improving the development efficiency of oil and gas resources, and thus has a broad market application prospect.

To fulfill said technical objective, the present invention adopts the following technical solutions.

According to the method of the present invention, drilling engineering parameters that can affect a penetration are selected from drilling data in on-site well-logging and well-measuring based on the drilling data, and the level of correlation between each drilling engineering parameter and the penetration rate is determined by using a correlation analysis model; and then, regression calculation is performed on the drilling engineering parameters by using the CART algorithm to obtain a weight model of the influencing factors of the penetration rate, so as to better predict and optimize the penetration rate.

A method for predicting and optimizing a penetration rate in oil and gas drilling based on a CART algorithm comprises the following steps.

Step 1: data collection. Since one model is applicable to one specific block, it is necessary to select a block and sort all available drilling data, that is, whole-meter well-logging data and well-measuring data, into a unified Excel table or TXT text as original drilling data.

Step 2: data preprocessing performed in spuds. Data preprocessing is performed by taking four parameters, i.e., a well depth, bit type, bit size, and deformation type as the basis for dividing different spuds, wherein drilling parameters that affect the penetration rate include drilling engineering parameters and original formation parameters, the drilling engineering parameters include a weight on bit, rotational speed, torque, drilling fluid density, displacement and riser pressure, and the original deformation parameters include a sonic time difference AC and natural gamma GR; and with 8 drilling parameters as different characteristic attributes, an initial data set $D_1$ is obtained by taking drilling data contained in each characteristic attribute as an input variable X and the penetration rate as an output variable Y.

Step 3: data correlation analysis. The correlation between the input variables and the penetration rate in the initial data set $D_1$ is analyzed by using a correlation coefficient method, correlation coefficients between the 8 input variables and the penetration rate are calculated in sequence, and the input variables are sorted according to the values of the correlation coefficients to obtain a training data set $D_2$ of different spuds, wherein $D_2 \subseteq D_1$.

Step 4: establishing and training of model. A regression tree model between the input variables and the penetration rate in the training data set $D_2$ of different spuds is established by using the CART algorithm (Li Hang. Statistical Learning Method. 2nd Edition [M], Beijing: Tsinghua University Press, 2019); the regression tree model is trained by randomly dividing 80% of data in the training data set $D_2$ as a training set, and the trained regression tree model is tested by using the remaining 20% of data as a test set; and it is considered that the model is available if a test score reaches 80 or above.

Step 5: prediction of penetration rate. By using the regression tree model with a binary tree structure obtained by the CART algorithm, information of each leaf node of the generated binary tree is analyzed, wherein an average value of the leaf nodes is used as a predicted value of the penetration rate.

Step 6: recommending of drilling parameters. The intensities of impacts of the input variables on the penetration rate from top to bottom are characterized by using the regression tree model with the binary tree structure obtained by the CART algorithm, wherein the topmost end represents the strongest impact, and the bottommost end represents the weakest impact; an optimal recommended value of the input variable is provided for nodes in each layer; and a node division result of each layer is traversed from top to bottom to acquire different recommended values of drilling parameters.

Step 7: optimal judgment of penetration rate. The recommended values of drilling parameters are substituted into the regression tree model based on the CART algorithm to obtain an optimized value of the penetration rate; a difference between the optimized value of the penetration rate and a predicted value of the penetration rate being less than 10% is taken as an optimal judgment condition; it is recommended to use the drilling parameters obtained in Step 6 if the optimal judgment condition is reached; or it returns to Step 3 for performing correlation analysis again.

Further, in Step 2, the spuds refer to drilling by using drill bits of different sizes during the drilling process, in which the size of each drill bit decreases as a drilling depth increases, and each time the bit size is changed and a casing is set by one layer is called one spud.

Further, in Step 2, a group of data in the initial data set D1 takes a length of an interval of 1 meter as a basic unit and includes drilling data $x_1^{(j)}$ of well depths corresponding to j(j=1, 2, ... , 8) characteristic attributes and penetration rate values $y_i$(i=1, 2, ... , n), and then, the initial data set D1 may be set as:

$$D_1=\{(x_1^{(j)},y_1),(x_2^{(j)},y_2);\ldots,(x_i(j),y_i)\}$$

Further, the correlation coefficient in Step 3 is a Pearson correlation coefficient which is a statistical indicator used to evaluate the closeness of the relationship between the two variables X and Y, and is suitable for the description of the linear relationship between two continuous variables, and the value of the Pearson correlation coefficient is not affected by a variable unit and concentration. The Pearson correlation coefficient is calculated by the following formula:

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

in which, $x_i$ and $y_i$(i=1, 2, ... , n) are values of two random variables X and Y, x and y are average values of a sample; and n is a sample capacity. The correlation coefficient value r is between ±1. The closer the correlation coefficient is to ±1, the more significant the correlation between the two variables is. When the correlation coefficient value is +1, it means that the two variables are completely positively correlated; and when the value is −1, it means that the two variables are completely negatively correlated. According to the values of the correlation b2 coefficient, the degree of variable association can be divided into several cases as shown in the following table:

| Absolute range of correlation coefficients | Degree of variable association |
|---|---|
| 1.00 | Completely correlated |
| 0.70–0.99 | Highly correlated |
| 0.40–0.69 | Moderately correlated |
| 0.10–0.39 | Lowly correlated |
| <0.10 | Weakly correlated or non-correlated |

Further, the CART algorithm in Step 4 is a kind of regression tree algorithm, and the specific principle is described as follows:

Step 4-1: determination of input variables and output variables. It is assumed that $X=\{x_1^{(j)}, x_2^{(j)}, x_3^{(j)}, \ldots, x_i^{(j)}\}$ is a value of each input variable, $Y=\{y_1, y_2 y_3 \ldots, y_i\}$ is a value of each output variable, $T_1, T_2, T_3, \ldots, T_j$ represent different characteristic attributes in the input variables, and different characteristic attributes correspond to different input variable values, wherein their relationship is shown in the following table:

| | Input variable | | | | Output |
|---|---|---|---|---|---|
| $T_1$ | $T_2$ | $T_3$ | ... | $T_j$ | variable |
| $x_1^{(1)}$ | $x_1^{(2)}$ | $x_1^{(3)}$ | ... | $x_1^{(j)}$ | $y_1$ |
| $x_2^{(1)}$ | $x_2^{(2)}$ | $x_2^{(3)}$ | ... | $x_2^{(j)}$ | $y_2$ |
| ... | ... | ... | ... | ... | ... |
| $x_i^{(1)}$ | $x_i^{(2)}$ | $x_i^{(3)}$ | ... | $x_i^{(j)}$ | $y_i$ |

Step 4-2: division of a data set. The regression tree divides data by using a bi-partitioning strategy. Different from a classification tree, the regression tree divides the data whose input variable values are less than or equal to a segmentation point value into a left subtree, and divides the data whose input variable values are greater than the segmentation point value into a right subtree. Assuming that the input data set has been divided into two left and right units R1 and R2 after a regression tree division, each unit Rm corresponds to a fixed output value Cm, and an optimal value $\hat{c}_m$, of the fixed output value is an average value of the output variable values $y_i$ corresponding to all the input variable values $x_i$ on $R_m$, and is expressed by the following formula:

$$\hat{c}_m = ave(y_i \mid x_i \in R_m) \text{ that is,}$$

$$\hat{c}_m = \frac{1}{N_m} \sum_{x_i \in R_m(j,s)} y_i, x \in R_i, m = 1, 2$$

Step 4-3: selection of optimal characteristic attributes. The CART regression tree selects the optimal characteristic attributes for each node division by using a sum of square errors. A formula for calculating the sum of square errors is as follows:

$$MSE = \sum(y_i - \hat{c}_m)^2, m = 1, 2$$

For the input variable value under each characteristic attribute, the sum of square errors of the output variable values corresponding to two sub-data sets after the input variable values are bi-partitioned are calculated, and the characteristic attribute with the minimum square error sum is selected as an optimal characteristic attribute $T_j$.

Step 4-4: selection of an optimal segmentation point. After the optimal characteristic attribute $T_j$ is determined, the next step is to determine the value $x_1^{(j)}$ of the optimal segmentation point s. The optimal characteristic attribute $T_j$ and the optimal segmentation point s need to satisfy the following formula at the same time:

$$\min_{j,s}\left[\min_{c_1}\sum_{x_i\in R_1(j,s)}(y_i-c_1)^2+\min_{c_2}\sum_{x_i\in R_2(j,s)}(y_i-c_2)^2\right]$$

At this time, the optimal output value $\hat{c}_m$, of the left subtree and the right subtree satisfies:

$$\hat{c}_1 = ave(y_i \mid x_i \in R_1(j, s))$$
$$\hat{c}_2 = ave(y_i \mid x_i \in R_2(j, s))$$

The optimal output values $\hat{c}_1$ and $\hat{c}_2$ are the optimal values of left and right leaf nodes, which is summarized in that an average value of all output target variables of data sub-sets obtained by the division is a value of the leaf node.

Step 4-5: division of data set according to optimal characteristics. After the optimal characteristic attribute $T_j$ and the value $x_1^{(j)}$ of the optimal segmentation points are determined, the regression tree classifies data whose attribute values are less than or equal to the optimal segmentation value into the left subtree, and classifies data whose attribute values are greater than the optimal segmentation value into the right subtree. In this case, the left and right units satisfy the following formula:

$$R_1(j, s) = \{x \mid x^{(j)} \le s\}$$
$$R_2(j, s) = \{x \mid x^{(j)} > s\}$$

Step 4-6: generation of the regression tree. All input characteristic attributes and input variables are traversed to find an optimal segmentation characteristic attribute j, and to form an optimal value pair (j, s), and an input space is divided into left and right units in sequence. Next, the above division process is repeated for each subunit until a stop condition is met, thus generating a regression tree.

Further, the process of predicting the penetration rate in Step 5 is as follows: a maximum division depth of the regression tree is set to n; a characteristic attribute with a minimum mean square error MSE is selected as an optimal characteristic attribute by calculating minimum mean square errors MSE of different characteristic attributes in a first layer, to obtain an optimal segmentation point; the data set is divided into two, i.e., a left subtree and a right subtree; division is continued in the same way to obtain four sub-nodes by taking two nodes divided from the first layer as parent nodes of second-layer nodes, and so on, to obtain sub-in each layer; final leaf nodes are obtained at the end of the division of all the sub-nodes in the $n^{th}$ layer; and the information of each leaf node of the generated binary tree is analyzed, wherein an average value of the leaf nodes is a predicted value of the penetration rate.

Compared with the prior art, the present invention has the following technical effects: the method can realize rapid analysis of historical drilling data and the optimal design of drilling parameters, and achieve the goals of improving the drilling efficiency and reducing the drilling cost.

DETAILED DESCRIPTION

The present invention will be further described below according to the accompanying drawings and embodiments, so that those skilled in the art can understand the present invention. However, it should be clear that the present invention is not limited to the scope of the specific embodiments. For those of ordinary skill in the art, as long as various changes fall within the spirit and scope of the present invention defined and determined by the appended claims, they are all protected.

Embodiment (Taking a Third Spud of a Well in an Oilfield Block as an Example)

Figure 1:
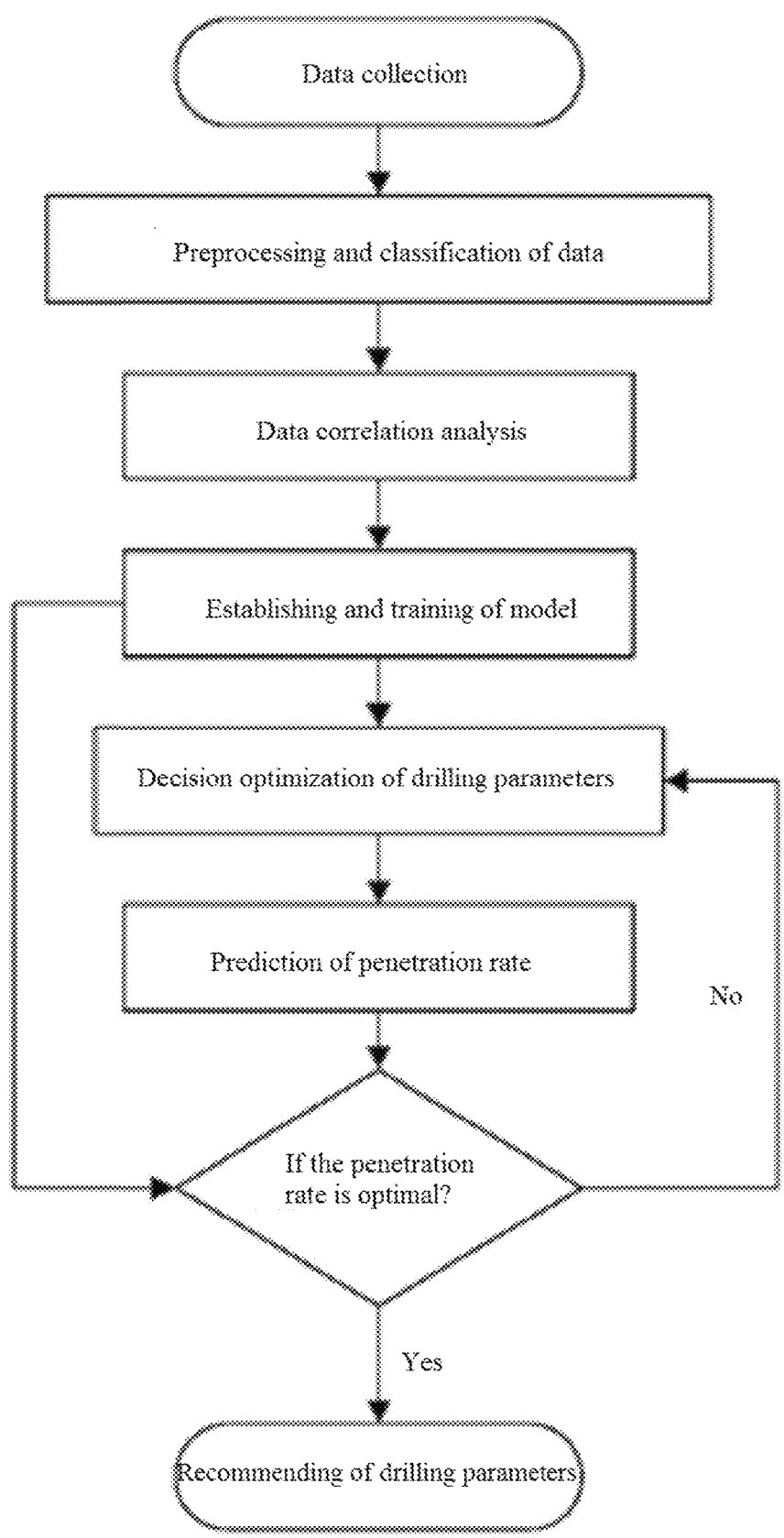
FIG. 1 is a flowchart of a method for predicting and optimizing a penetration rate in oil and gas drilling based on a CART algorithm.

A method for predicting and optimizing a penetration rate in oil and gas drilling based on a CART regression tree model (see FIG. 1 for a flowchart) comprises the following steps.

Step 1: data collection. Well-logging data and well-measuring data per meter of all wells in the oilfield block are acquired, a separate folder and Excel table are created for each well, and data from different sources are sorted into the corresponding data table of each well as an original data set.

Step 2: data preprocessing. In the process of establishing the relevant model, it is necessary to strictly control input parameters involved in the analysis. The data preprocessing is performed in spuds. Firstly, the original drilling data is divided into different spuds according to the four parameters, i.e., a well depth, bit type, bit size, and formation type. The data of each well is processed based on the spuds according to the bit size. A new table file is created for the data of each spud of each well for subsequent calls. The sizes of the drill bit corresponding to respective spuds are: third spud (333.8 mm), fourth spud (241.3 mm), and fifth spud (168.3 mm). Secondly, 8 drilling parameters that affect the penetration rate (the drilling engineering parameters include: a weight on bit, rotational speed, torque, drilling fluid density, displacement, riser pressure; and original formation parameters include: a sonic time difference AC, and natural gamma GR) are determined as input characteristic attributes T, and an initial data set $D_1$ is obtained by taking all drilling data contained in the 8 characteristic attributes as input variables X and the penetration rate as an output variable Y.

| Input parameter type | Characteristic attribute name |
|---|---|
| Drilling parameters | Weight on bit |
| | Rotational speed |
| | Torque |
| | Drilling fluid density |
| | Displacement |
| | Riser pressure |
| Original formation parameters | GR |
| | AC |

Figure 3:
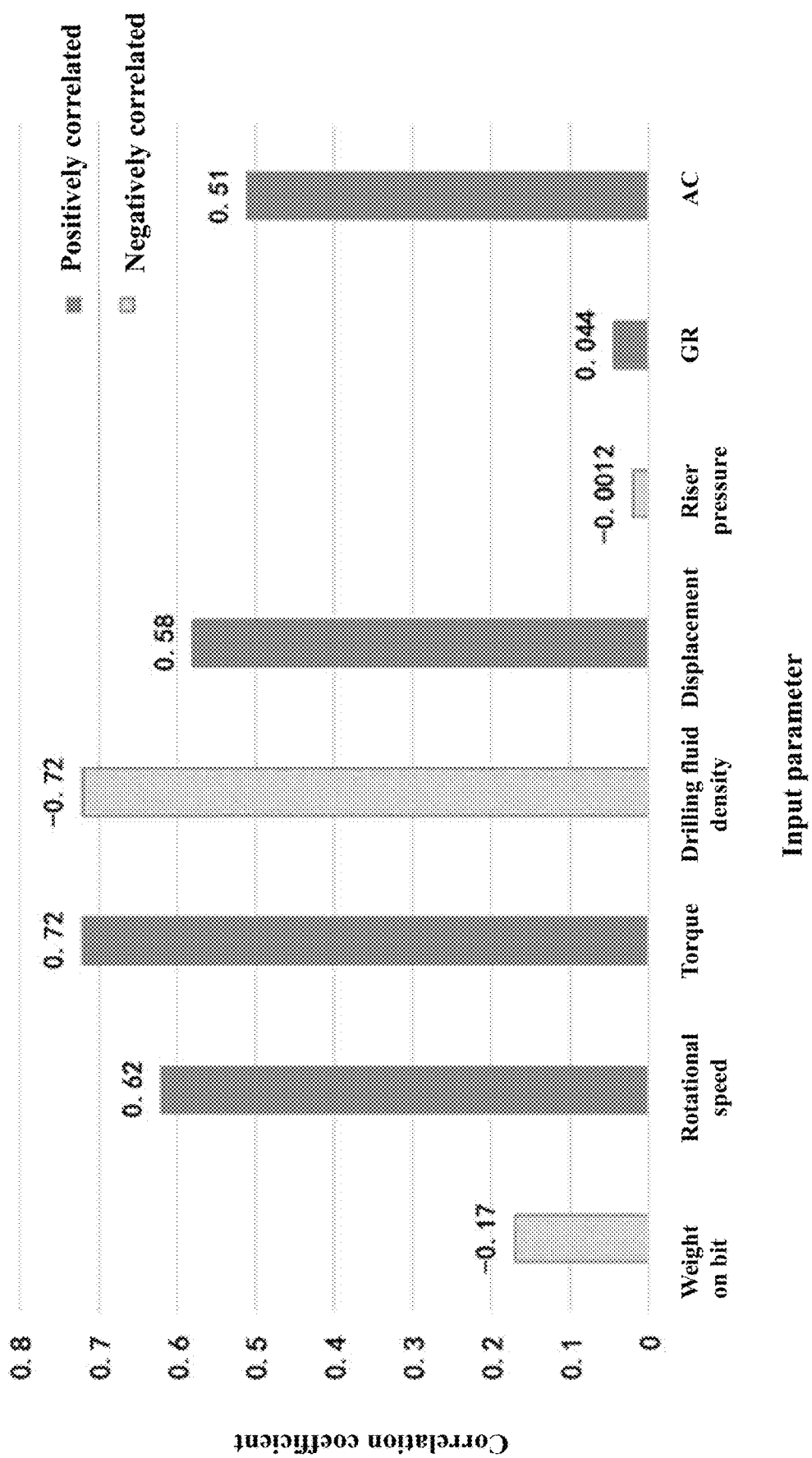
FIG. 3 shows a calculation result of correlation coefficients between input variables and a penetration rate in a third spud of an oilfield block.

Step 3: data correlation analysis. The correlation between the input variables and the penetration rate is analyzed by using a Pearson correlation coefficient, and correlation coefficients between the input variables and the penetration rate are calculated and sorted, and training input variables of a CART algorithm model are determined according to the levels of the correlation coefficients, and the penetration rate is used as an output variable. Correlation analysis results between the input variables and the penetration rate may be obtained by compiling codes through Python and importing them to the initial data set $D_1$ in Step 2, and are displayed in the form of a histogram (see FIG. 3).

Through the correlation analysis between the input variables and the penetration rate in the third spud, the output histogram result (see FIG. 3) can be obtained. The correlation degrees of the correlation coefficients between all drilling parameters and the penetration rate can be summarized by sorting according to the absolute values of the correlation coefficients between different input variables and the penetration rate in the histogram,

| Correlation degrees of variables | Names of characteristic attributes |
|---|---|
| Highly correlated | Torque, drilling fluid density |
| Moderately correlated | Rotational speed, displacement, AC |
| Lowly correlated | Weight on bit |
| Weakly correlated or non-correlated | Riser pressure, GR |

The parameter items that are lowly, moderately, and highly correlated to the penetration rate are screened. The absolute values of the correlation coefficients are sorted. Input characteristic attributes for training of the CART algorithm model in the third spud of a well of a certain oilfield block are determined according to levels of the correlation coefficients to obtain a training data set $D_2$, the input characteristic attributes including a drilling fluid density, torque, rotational speed, displacement, AC, and weight on bit.

Figure 2:
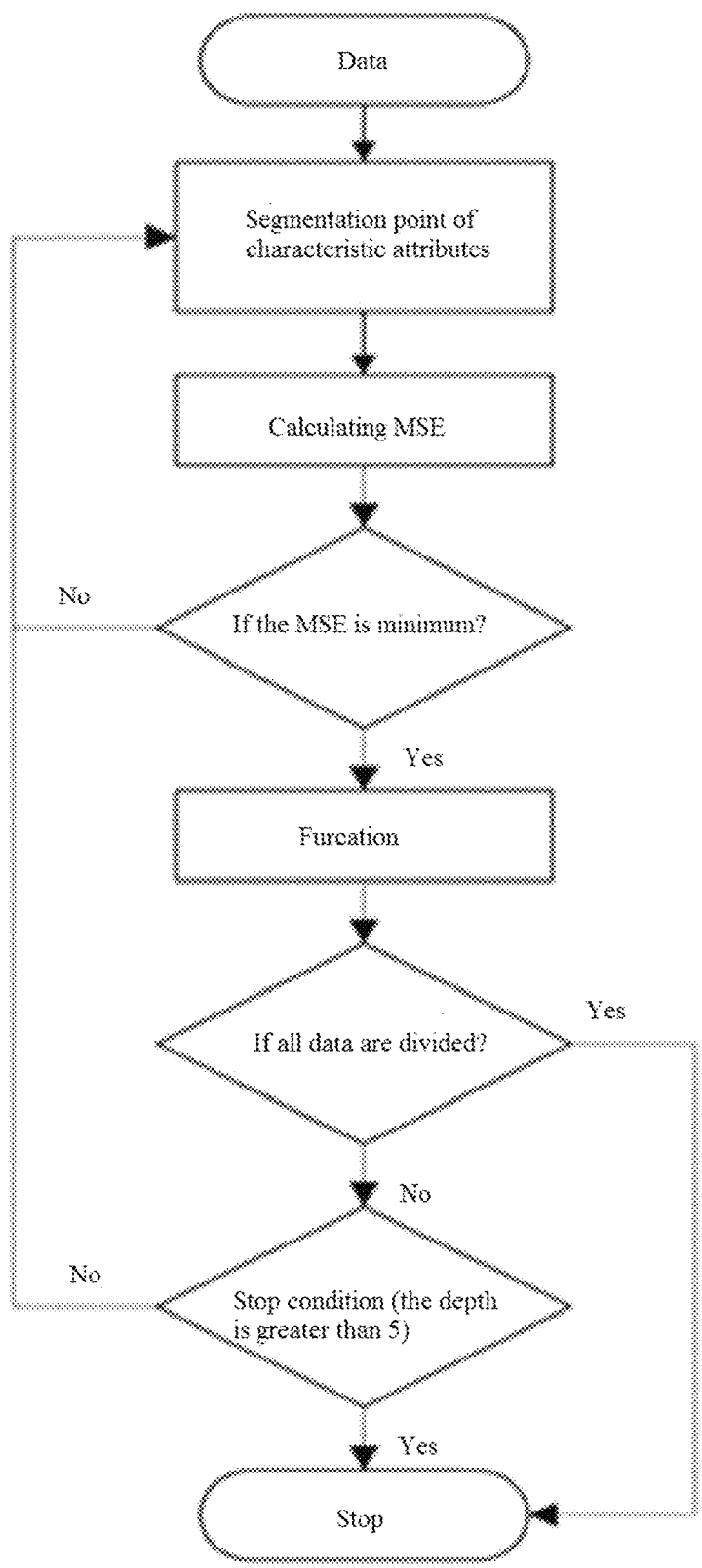
FIG. 2 is a flowchart of a CART regression tree algorithm.
Figure 4:
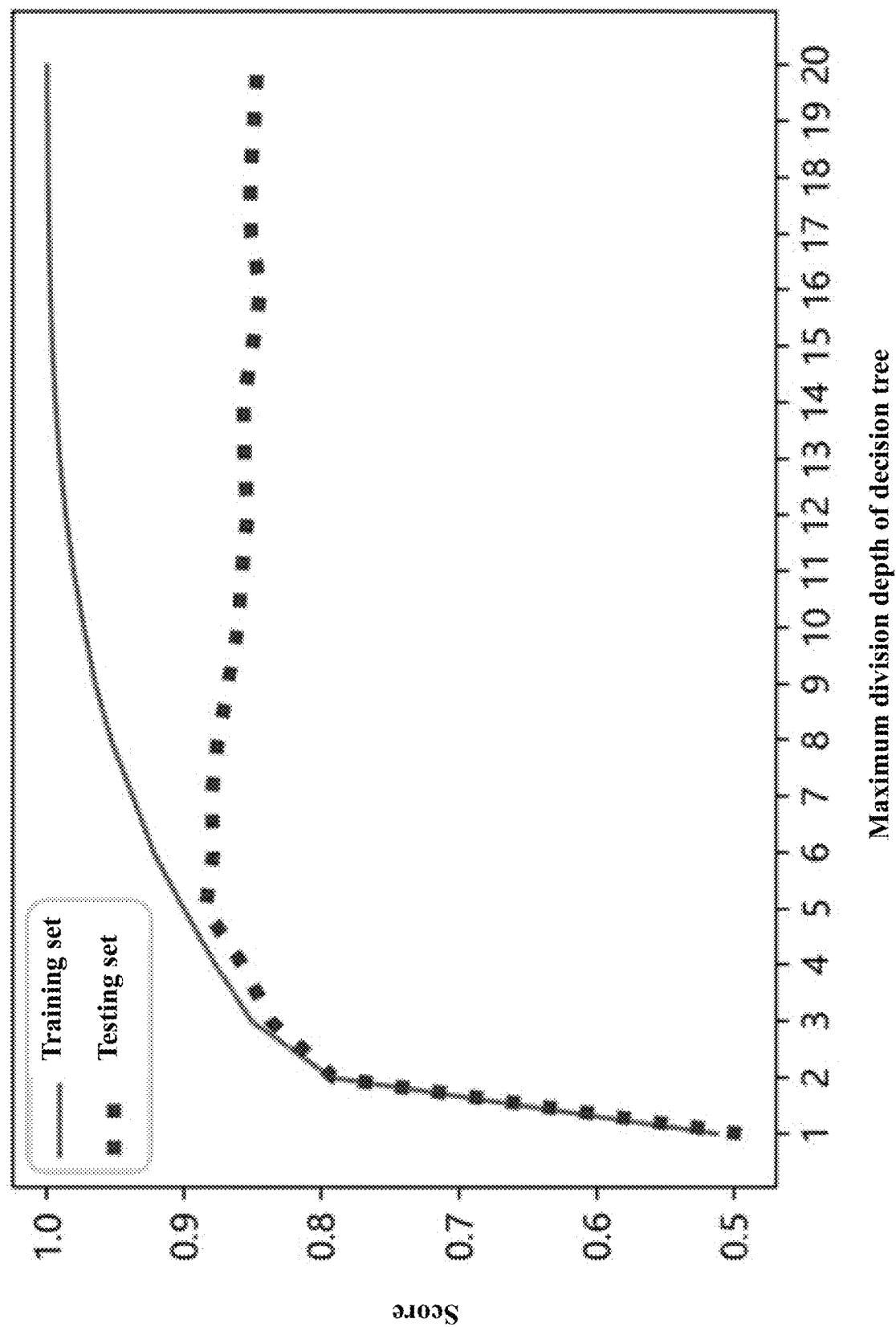
FIG. 4 is a variation curve of a training set score and a test set score with a division depth of the regression tree in the embodiment.

Step 4: Establishing and training of model. A regression tree model between the input variables and the penetration rate is established by using the CART algorithm. The specific division steps of the regression tree are shown in FIG. 2. The regression tree model is trained by randomly dividing 80% of data in the training data set $D_2$ in Step 3 as a training set, and the remaining 20% of data is used as a test set to adjust and test the trained regression tree model. Different division depths can obtain different model fitting effects, and further obtain a change curve of training set scores and test set scores with the division depth of the regression tree (FIG. 4). Through the above steps, the regression tree model based on the CART algorithm can be obtained, and a result graph of a visualization model of the regression tree can be exported through a Graphviz visualization module in Python.

Figure 5:
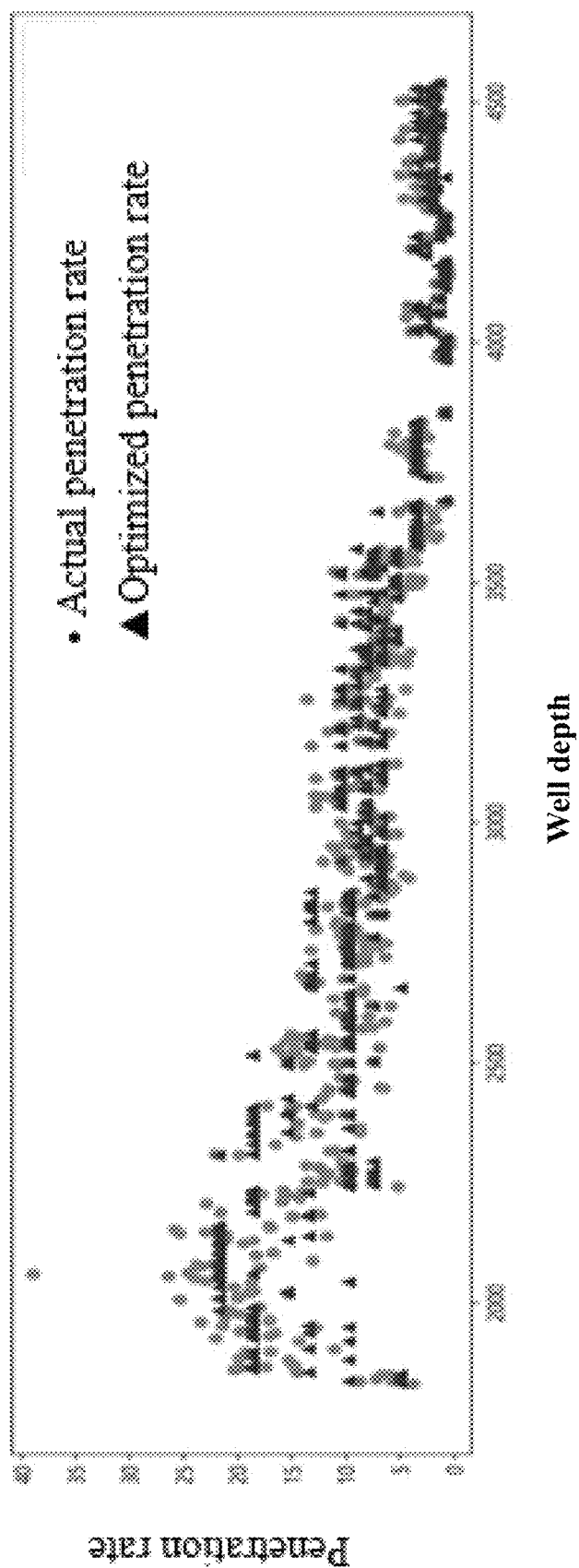
FIG. 5 is a scatter diagram showing the comparison between a predicted penetration rate and an actual penetration rate in the embodiment.

Step 5: prediction of penetration rate. A regression tree model with a binary tree structure may be obtained by using the CART tree algorithm, and information of each leaf node of the generated binary tree is analyzed to obtain a predicted value of the penetration rate. A scatter diagram showing the comparison between the predicted value of the penetration rate obtained by the regression tree model and an actual value is shown in FIG. 5. The specific analysis is as follows.

In the first layer: by calculating a minimum mean square error MSE between different characteristic attributes imported into the data set, this characteristic attribute of the drilling fluid density and its value of 1.255 are selected as a segmentation point. Then, a data set is divided into two with the drilling fluid density value of 1.255 as a segmentation point. When the drilling fluid density is less than or equal to this value, the eligible data is classified into a left subtree, and the rest of data is classified into a right subtree.

In the second to fifth layer: two nodes (in the second layer) divided from the first layer are used as parent nodes of third-layer nodes, and the division continues with the same logic to obtain 4 sub-nodes, and so on to obtain sub-nodes in each layer. It needs to be pointed out that when the data volume of the sub-nodes is too small or meets a dividing condition, the division will automatically stop, and the sub-nodes at this time are root nodes.

In the sixth layer: a maximum division depth of the regression tree is set to 5, and the division automatically stops after the division of all the sub-nodes in the fifth layer is completed, and final leaf nodes are obtained. MSE represents a minimum mean square error, samples represents a data volume of this node, and value represents a predicted value of the penetration rate.

Step 6: recommending of drilling parameters. A regression tree model with a binary tree structure may be obtained by using the CART tree algorithm, and information of each leaf node of the generated binary tree is analyzed to obtain specific input variables and value ranges thereof; and the space division results of the characteristics of the nodes in each layer are traversed from top to bottom to obtain the intensities of the impacts of different input variables on the penetration rate and the recommended values of drilling parameters.

A description will be made by taking a bifurcation route on the leftmost side of the regression tree model as an example: in the end, there are 15 groups of optimal prediction values of the penetration rate in drilling depths being 5.01 m/h. The factors that affect the penetration rate of this group of well depth intervals from strong to weak are drilling fluid density, rotational speed, and torque. The values of these influencing factors are drilling fluid density being 1.255, rotational speed being 106.5, and torque being 9.95, and these ranges are used as the recommended values of drilling parameters. In the same way, the recommended values of drilling parameters for other branch routes can be obtained.

Step 7: optimal judgment of penetration rate. The recommended values of drilling parameters are substituted into the regression tree model based on the CART algorithm to predict a penetration rate; it is determined whether the penetration rate is optimal, and the drilling parameters are recommended if the penetration rate is optimal; or it returns to Step 3 for performing correlation analysis again.

Figure 6:
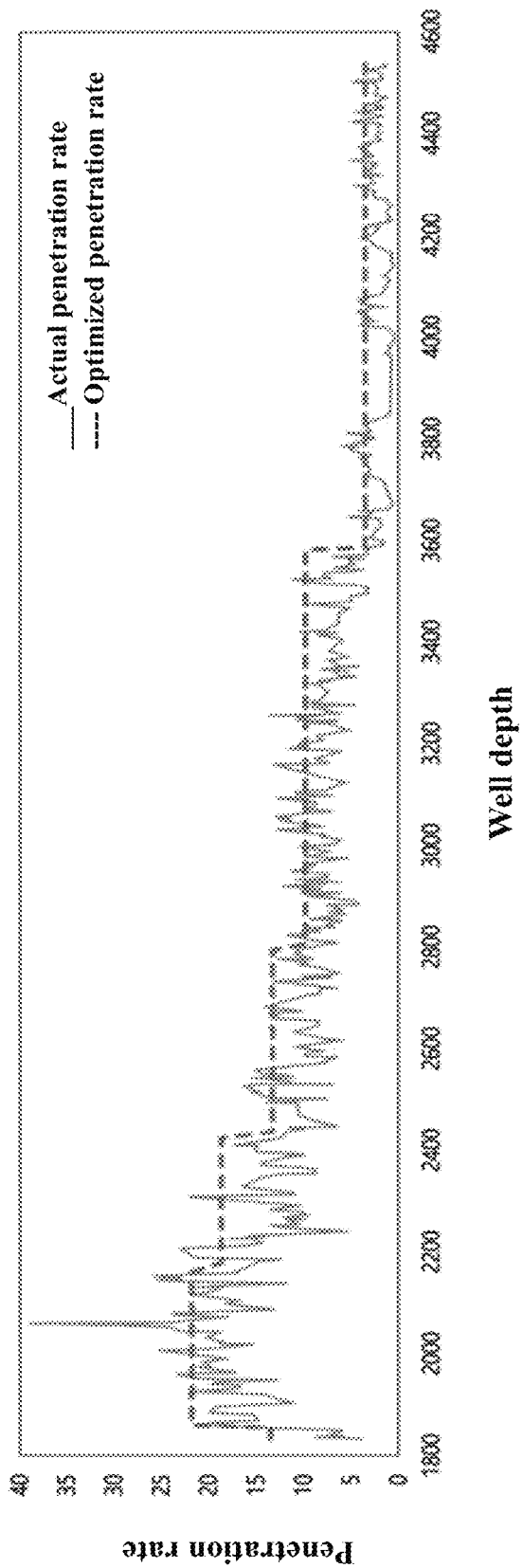
FIG. 6 is a graph showing the comparison between an optimized penetration rate and the actual penetration rate in the embodiment.

By using the method of the present invention to analyze relevant characteristics of the drilling data of the oil field block and establish the regression tree prediction model, it can be found that in the cases of similar formation conditions, the same well structure and the same bit type and bit size, when drilling spuds are different, that is, when drilling depths are different, the degrees of importance of the factors that affect the penetration rate are also different. By comparing the correlation coefficients of drilling engineering parameters in each spud, the major factors affecting the penetration rate in a drilling depth of 3000~5000 m are torque and drilling fluid density, and the relevant coefficients are highly correlated when they are greater than 0.70; the major factors affecting the penetration rate in the drilling depth of 5000~6000 m are weight on bit and GR, and the relevant coefficients are moderately correlated; and the major factors affecting the penetration rate in the drilling depth of 6000~7000 m are torque and riser pressure, and the relevant coefficients are moderately correlated. As can be seen from Step 4, a change curve of training set scores and test set scores with the division depth of the regression tree (see FIG. 4) and a visualized result graph based on the CART regression tree may be obtained. According to the change curve of the training set scores and the test set scores with the division depth of the regression tree, it can be seen that the regression tree has the optimal score on the model test set when the maximum division depth is 5. At this time, a determination coefficient $R^2$ of the model is 0.86, which indicates that a fitting effect of the model is already obvious. It can be seen from Step 5 that a scatter diagram showing the comparison between the predicted penetration rate and the actual penetration rate can be obtained (see FIG. 5). It is possible to further observe the fitting condition between the penetration rate predicted by the CART regression tree and the actual test set. It can be found that the prediction of the second half of the third spud is better than the first half, with a higher degree of agreement. A graph (see FIG. 6) showing the comparison between the optimized penetration rate and the actual penetration rate may be obtained from Step 6 and Step 7. The prediction and optimization of the penetration rates in the fourth spud and the fifth spud are the same as that of the third spud, and can be completed by repeating Steps 3-7.

The description of the above embodiments is only used to help the understanding of the methods and core ideas of the present invention thereof of the present invention. At the same time, for those of ordinary skill in the art, according to the ideas of the present invention, there will be changes in the specific embodiments and the scope of application. In summary, the content of the present description should not be construed as a limitation of the present invention.

The invention claimed is:

1. A method for optimizing a drilling penetration rate in oil and gas drilling, comprising the following steps:

Step 1: selecting a block and sorting drilling data, wherein the drilling data comprises whole-meter well-logging data and well-measuring data, into a unified table or text file as original drilling data;

Step 2: performing data preprocessing by taking a well depth, bit type, bit size, and deformation type as the basis for dividing different spuds, wherein drilling parameters that affect the penetration rate include drilling engineering parameters and original formation parameters, wherein the drilling engineering parameters include a weight on bit, rotation speed, torque, drilling fluid density, displacement and riser pressure, and the original deformation parameters include a sonic time difference and natural gamma; then, with 8 drilling parameters as different characteristic attributes, obtaining an initial data set $D_1$ by taking drilling data contained in each characteristic attribute as an input variable X and the penetration rate as an output variable Y;

Step 3: performing data correlation analysis: analyzing the correlation between the input variables in the initial data set $D_1$ and the penetration rate by using a correlation coefficient method, calculating correlation coefficients between the 8 input variables and the penetration rate in sequence, and sorting the input variables according to the values of the correlation coefficients to obtain a training data set $D_2$ of different spuds;

Step 4: establishing a regression tree model between the input variables in the training data set $D_2$ of different spuds and the penetration rate by using the CART algorithm, training the regression tree model by randomly dividing 80% of data in the training data set $D_2$ as a training set, and testing the trained regression tree model by using the remaining 20% of data as a test set, wherein it is considered that the model is available if a test score reaches 80 or above;

Step 5: predicting a penetration rate, and analyzing, by using the regression tree model with a binary tree structure obtained by the CART algorithm, information of each leaf node of the generated binary tree, wherein an average value of the leaf nodes is used as a predicted value of the penetration rate;

Step 6: characterizing the intensities of impacts of the input variables on the penetration rate from top to bottom by using the regression tree model with the binary tree structure obtained by the CART algorithm, wherein the topmost end represents the strongest impact, and the bottommost end represents the weakest impact;

providing an optimal recommended value of the input variable for nodes in each layer; traversing a node division result of each layer from top to bottom to obtain different recommended values of drilling parameters; and Step 7: substituting the recommended values of drilling parameters into the regression tree model based on the CART algorithm to obtain an optimized value of the penetration rate;

taking a difference between the optimized value of the penetration rate and a predicted value of the penetration rate being less than 10% as an optimal judgment condition; recommending to use the drilling parameters obtained in Step 6 if the optimal judgment condition is reached; if not, returning to the Step 3 and performing correlation analysis again;

wherein in Step 2, the spuds are drilling layers, wherein, drill bits of different sizes are used during the drilling process, and the size of each drill bit decreases as a drilling depth increases, and wherein each time the bit size is changed and a casing is set by one layer is called one spud;

drilling an oil or gas well, wherein, for each spud, drilling rates are optimized by adjusting recommended values of drilling parameters, wherein, in a drilling depth range of 3000~5000 m, drilling rate is optimized through adjusting torque and drilling fluid density; wherein, in a drilling depth range of 5000~6000 m, drilling rate is optimized through adjusting weight on bit; and wherein, and in a drilling depth range of 6000~7000 m, drilling rate is optimized through adjusting torque and riser pressure, thus increasing drilling rate relative to a drilling process that does not optimize by adjusting said drilling parameters.

2. The method for optimizing a drilling penetration rate in oil and gas drilling according to claim 1, wherein in Step 2, a group of data in the initial data set $D_1$ takes a length of an interval of 1 meter as a basic unit and includes drilling data $x_1^{(j)}$ of well depths corresponding to j (j=1, 2, . . . ,8) characteristic attributes and penetration rate values $y_i$(i=1, 2, . . . , n), and wherein the initial data set $D_1$ is:

$$D_1=\{(x_1^{(j)},y_1),(x_2^{(j)},y_2), \ldots ,(x_i^{(j)},y_i)\}.$$

3. The method for optimizing a drilling penetration rate in oil and gas drilling according to claim 1, wherein the correlation coefficient in Step 3 is a Pearson correlation coefficient which is a statistical indicator used to evaluate the closeness of the relationship between the two variables X and Y, and the correlation coefficient value r is between ±1.

4. The method for optimizing a drilling penetration rate in oil and gas drilling according to claim 1, wherein the process of predicting the penetration rate in Step 5 is as follows: a maximum division depth of a regression tree is set to n; a characteristic attribute with a minimum mean square error MSE is selected as an optimal characteristic attribute by calculating minimum mean square errors MSE of different characteristic attributes in the first layer, to obtain an optimal segmentation point; the data set is divided into two, i.e., a left subtree and a right subtree; continuing to perform division in the same way to obtain four sub-nodes by taking two nodes divided from the first layer as parent nodes of second-layer nodes, and so on, to obtain sub-nodes of each layer; stopping after all the sub-nodes of the $n^{th}$ layer are divided, to obtain final leaf nodes; and analyzing the information of each leaf node of the generated binary tree, wherein an average value of the leaf nodes is a predicted value of the penetration rate.

* * * * *